(No Model.)

E. A. STEARS.
TRAP.

No. 381,288. Patented Apr. 17, 1888.

WITNESSES:

INVENTOR:
E. A. Stears
BY Munn & Co.
ATTORNEYS.

UNITED STATES PATENT OFFICE.

EMILY A. STEARS, OF BROOKLYN, NEW YORK.

TRAP.

SPECIFICATION forming part of Letters Patent No. 381,288, dated April 17, 1888.

Application filed April 25, 1887. Serial No. 236,094. (No model.)

*To all whom it may concern:*

Be it known that I, EMILY A. STEARS, of Brooklyn, in the county of Kings and State of New York, have invented new and useful Improvements in Sink-Traps, of which the following is a specification, reference being had to the annexed drawings, forming a part thereof, in which—

Figure 1:
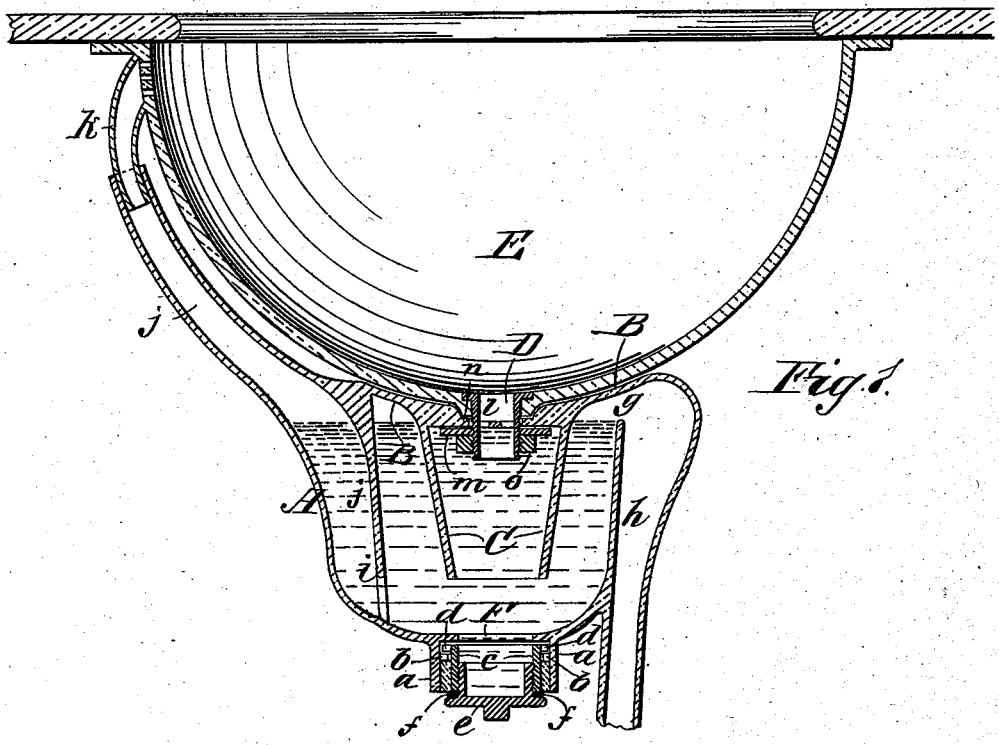
Figure 2:
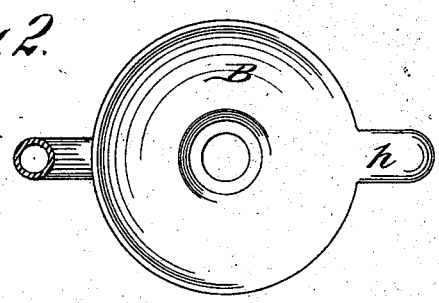
Figure 3:
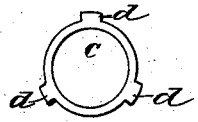

Figure 1 is a vertical transverse section of my improved sink-trap, showing its application to a stationary wash-bowl. Fig. 2 is a plan view of the trap detached from the bowl, and Fig. 3 is a detail view of the thimble for receiving the plug at the bottom of the trap.

Similar letters of reference indicate corresponding parts in all the views.

The object of my invention is to provide a trap for application to wash-bowls, bath-tubs, wash-tubs, and sinks, which will permit of the free escape of the water and will effectually prevent the entrance of sewer-gas into the house through the wash-bowl and sink connections, and which may be readily cleaned.

The invention consists in the peculiar construction and arrangement of parts, as hereinafter described, and pointed out in the claims.

Although I have shown my invention applied to a stationary wash-bowl, I do not limit or confine myself to its application to wash-bowls, as it may be applied in a slightly-modified form to bath-tubs, sinks, and wash-tubs with equal advantage.

The body A of the trap consists of a flaring bowl of clay or other suitable material, provided with a concave cover or top, B, permanently attached thereto, and having a downwardly-projecting tube, C, which extends nearly to the bottom of the bowl. The concave top B is provided with an annular recess at the top of the tube C to receive the downwardly-projecting portion D of the wash-bowl E. The bottom of the bowl A is provided with an opening, F, surrounded by a collar, a, larger than the opening and provided with inwardly-projecting lugs b. To the collar a is fitted a metallic thimble, c, provided with lugs d, which enter between the lugs b and are turned to bring them into engagement with the said lugs b. The thimble c is further secured by cement. The interior of the thimble is screw-threaded to receive a plug, e, by which the bottom of the bowl A is closed. The thimble is screw-threaded or roughened on the exterior to receive the cement by which it is held in place in the collar a. A packing-ring, f, is placed between the flange of the plug e and the thimble c.

In the side of the trap-bowl A, near the top, is formed an opening, g, for the escape of water from the bowl, and the passage h, communicating with the opening g, extends downward and projects below the bottom of the bowl A in the form of a tube. The opening g determines the level of the water in the bowl A, and the bowl contains sufficient water to effectively maintain the seal of the trap, so that the trap is not liable to leakage from the evaporation of the water employed to form the seal.

In the side of the bowl A, opposite the opening g and near the bottom thereof, is formed an opening, i, which communicates with the passage j, extending upward along the outside of the bowl. The overflow k of the wash-bowl E is inserted in the upper end of the passage f and cemented therein. The entire length of the tube C is always immersed, and the opening i, communicating with the passage j, is always covered with water, so that, whether the wash-bowl E is cemented in its place in the trap-bowl A or not, the seal is always effectual, and no sewer-gas can enter the building through the trap.

In the bottom of the bowl E is inserted a short flanged tube, l, which extends downward into the tube C of the bowl A and receives a cross-bar or collar, m, which is pressed upward against the inwardly-projecting flange n of the tube C by a nut, o, screwed on the threaded lower end of the tube l, fastening the trap-bowl A and the wash-bowl E firmly together.

By making the top of the trap-bowl A flat instead of concave the trap may be applied to bath-tubs, wash-tubs, &c. As the improved trap is made integrally of a single piece of material, there are no joints, and consequently no liability to leakage of sewer-gas.

A trap-bowl constructed according to my invention and having the discharge-opening arranged at the top thereof prevents siphoning and causes the trap-bowl to always remain filled.

The passage j, as shown in the drawings, is through a long tube extending from the trap-bowl A to the overflow of the wash-bowl; but it is unnecessary to make the said tube of a single piece, as the water-seal is continuously maintained at the lower end of the passage $j$.

Having thus fully described my invention, I claim as new and desire to secure by Letters Patent—

1. A trap-bowl having an apertured top and provided with a tube projecting downward from the inner surface of the top and integral therewith, a discharge-opening near the top, a discharge-passage communicating with the discharge-opening and extending down below the bottom of the bowl, an overflow-inlet near the bottom, and a passage extending up along the side of the bowl and communicating with the inlet-opening, substantially as described.

2. An improved trap-bowl having an apertured top and bottom, the aperture in the bottom being closed by a plug and provided with a discharge-opening near the top, a discharge-passage communicating with the discharge-opening, an overflow-inlet near the bottom and opposite the discharge-opening, and a passage extending up along the side of the bowl and communicating with the inlet-opening, substantially as herein shown and described.

EMILY A. STEARS.

Witnesses:
GEO. M. HOPKINS,
C. SEDGWICK.